United States Patent
Lonardi et al.

(10) Patent No.: US 6,792,973 B2
(45) Date of Patent: Sep. 21, 2004

(54) GAS TIGHT SHUT OFF VALVE FOR A MATERIAL CHARGING OR DISCHARGING LOCK

(75) Inventors: Emile Lonardi, Bascharage (LU); Patrick Hutmacher, Bettembourg (LU)

(73) Assignee: Paul Wurth S.A., Luxembourg (LU)

(*) Notice: Subject to any disclaimer, the term of this patent is extended or adjusted under 35 U.S.C. 154(b) by 0 days.

(21) Appl. No.: 10/296,415

(22) PCT Filed: May 28, 2001

(86) PCT No.: PCT/EP01/06062
§ 371 (c)(1),
(2), (4) Date: Apr. 25, 2003

(87) PCT Pub. No.: WO01/92767
PCT Pub. Date: Dec. 6, 2001

(65) Prior Publication Data
US 2003/0164191 A1 Sep. 4, 2003

(30) Foreign Application Priority Data
May 30, 2000 (LU) ................................. 90590

(51) Int. Cl.[7] ............................ F16K 49/00; F16K 1/20
(52) U.S. Cl. .................... 137/527.6; 137/340; 137/512; 251/333
(58) Field of Search .................. 251/333; 137/512, 137/377, 527, 527.4, 527.6, 334, 340, 613, 614.2

(56) References Cited

U.S. PATENT DOCUMENTS

| 4,546,792 A | * 10/1985 | Lew et al. ................... 137/527 |
| 5,022,806 A | * 6/1991 | Lonardi et al. ............. 414/208 |
| 5,103,858 A | 4/1992 | Hunt |
| 5,676,170 A | 10/1997 | Andonov et al. |
| 6,004,090 A | * 12/1999 | Axelsson ..................... 414/206 |

FOREIGN PATENT DOCUMENTS

| DE | 1675437 A | 1/1971 |
| JP | 58178060 A | 10/1983 |

\* cited by examiner

Primary Examiner—David A. Scherbel
Assistant Examiner—Ramesh Krishnamurthy
(74) Attorney, Agent, or Firm—McCormick, Paulding & Huber LLP

(57) ABSTRACT

A gas tight shut-off valve for a material charging or discharging lock includes a valve closing element that is movable relative to a valve a seat, between a first position which the valve closing element and the annular valve seat can be axially pressed together, and a second position in which the valve closing element is located laterally of the discharge opening in the valve seat. A soft sealing element is associated either with the annular valve seat or with the valve closing element. The valve further includes a heat protecting element which is movable between a first position in which it covers the soft sealing element when the valve closing element is in its second position, and a second position in which it uncovers the soft sealing element.

18 Claims, 14 Drawing Sheets

GAS TIGHT SHUT OFF VALVE FOR A MATERIAL CHARGING OR DISCHARGING LOCK

CROSS-REFERENCE RELATED APPLICATIONS

This application is entitled to the benefit of and incorporates by reference in their entireties essential subject matter disclosed in International Application No. PCT/EP01/06062 filed on May 28, 2001 and Luxembourg Patent Application No. 90590 filed on May 30, 2000.

FIELD OF THE INVENTION

The present invention relates to a gas-tight shut-off valve for a material charging or discharging lock, which is subjected to high operation temperatures.

BACKGROUND OF THE INVENTION

A standard gas-tight shut-off valve for a material charging or discharging lock of a lock comprises a gas-tight valve housing with an annular valve seat connected thereto and a valve closing element therein associated with this valve seat. The valve closing element is movable between a first position, in which the valve closing element and the annular valve seat can be axially pressed together, and a second position, in which it is located laterally of said discharge opening. A soft sealing means, generally a synthetic seal ring, is mounted either in the annular valve seat or in the valve closing element, so as to provide the required gas-tightness when the valve closing element and the annular valve seat are pressed together.

If such a material charging or discharging lock has to be designed for high working temperatures (e.g. working temperatures above 500° C.), the use of a synthetic seal ring in the gas-tight valve constitutes a problem. Indeed, known synthetic seal rings, which are suitable for use in such material lock valves, are only warranted for working temperatures up to 250° C.

In order to maintain the working temperature of the seal ring as low as possible, it is known to cool the element containing the groove in which the synthetic seal ring is received and the contact surface on the element against which the synthetic seal ring is pressed. However, when the gas-tight valve is open, the sealing surface of the synthetic seal ring is uncovered by the cooled closing element and therefore directly exposed to heat radiation in the valve housing. Furthermore, as the synthetic seal ring is a very bad conductor of heat, the surface temperature of the exposed sealing surface of the seal ring is not substantially reduced by the cooling of the element containing the groove in which the synthetic seal ring is received. It follows that the exposed sealing surface risks to be damaged if the radiation temperature in the valve housing is substantially higher than the warranted working temperature of the seal ring. This explains why—despite cooled valve seats and closing elements—soft sealing means cannot be used if the material charging or discharging lock is to be designed for a working temperature that is substantially higher than the warranted working temperature of available soft sealing means. In such a case, metallic seal rings have to be used, which have however the disadvantage to provide a less good and in particular a less reliable gas-tightness.

OBJECTS AND SUMMARY OF THE INVENTION

The technical problem underlying the present invention is to provide a gas-tight shut-off valve for a material charging or discharging lock in which soft sealing means can be used to achieve gas-tightness between the valve seat and the closing element, despite the fact that the material charging or discharging lock has to be designed for a working temperature substantially higher than the warranted working temperature of the soft sealing means. This problem is solved by a gas-tight shut-off valve as claimed in claim 1.

A gas-tight shut-off valve for a material charging or discharging lock in accordance with the invention comprises in a manner known per se: a valve housing; an annular valve seat connected to the valve housing and surrounding a discharge opening; a valve closing element associated with the valve seat, this valve closing element being movable between a first position, in which the valve closing element and the annular valve seat can be axially pressed together, and a second position in which the valve closing element is located laterally of the discharge opening; means for axially pressing the valve closing element and the annular valve seat together when the valve closing element in its first position; and a soft sealing means associated with the annular valve seat, respectively with the valve closing element, this soft sealing means having an exposed sealing surface to be pressed against a sealing means contact surface on the valve closing element, respectively on the valve seat, for providing gas-tightness when the valve seat and the valve closing element are pressed together. According to an important aspect of the invention, the gas-tight shut-off valve further comprises a heat protecting element that is movable between a first position, in which it covers the exposed sealing surface of the soft sealing means when the valve closing element is in its second position, and a second position in which it uncovers the exposed sealing surface, so as to enable again a gas-tight contact between the exposed sealing surface and the sealing means contact surface. In other words, as soon as the closing element uncovers the exposed sealing surface of the soft sealing means when the valve is opened, the movable heat protecting element is moved over the exposed sealing surface of the soft sealing means, so as to protect the latter against direct heat radiation. Before the valve is closed, the heat protecting element uncovers again the exposed sealing surface of the soft sealing means, so that the latter can fulfil its sealing function between the closing element and the annular valve seat. Thus, the exposed sealing surface of the soft sealing means is efficiently protected against direct heat radiation, as well in the closed valve as in the open valve.

In order to maintain the working temperature of the seal ring as low as possible in the closed valve, the element in which the synthetic seal ring is mounted and the contact surface on the other element against which the synthetic seal ring is pressed are generally cooled. The heat protecting element advantageously also comprises an internal cooling circuit, so as to ensure that the temperature of its surface facing the exposed sealing surface of the soft sealing means is always below the warranted working temperature of the latter.

In a preferred embodiment, the heat protecting element comprises a connection to a gas circuit and gas outlet nozzles located in the heat protecting element, so as to be capable of blowing a gas onto the exposed sealing surface. Thus the heat protecting element is capable of cooling the exposed sealing surface, without being in direct contact with the latter. It will further be appreciated that the gas blown onto the exposed sealing surface cleans the latter from material particles. Thus the heat protecting element also helps to protect the exposed sealing surface against mechanical damages.

In a first embodiment of the gas-tight valve, the soft sealing means is associated with the annular valve seat and the heat protecting element has a discharge opening therein, which is axially aligned with the discharge opening in the annular valve seat when the heat protecting element is in its first position. In this case, the heat protecting element is e.g. a ring-shaped element, which is pivotable about an pivoting axis between its first and second position. This pivoting axis may be parallel to the central axis of the annular valve seat and located laterally of the annular valve seat. Alternatively, the pivoting axis may be perpendicular to the direction of the central axis of the annular valve seat and located laterally of the annular valve seat.

The heat protecting element and the valve closing element may also form a combined closing-heat protecting element, which has a closing portion fulfilling the function of the valve closing element and a heat protecting portion fulfilling the function of the heat protecting element. The heat protecting portion of such a combined closing-heat protecting element has a discharge opening therein, which is axially aligned with the discharge opening in the annular valve seat when the heat protecting portion covers the soft sealing means. Such a combined closing-heat protecting element may e.g. be a spherical or cylindrical element which is pivotable about a pivoting axis that is perpendicular to the central axis of the annular valve seat. Alternatively, it may be a flat plate element which is movable in a plane that is perpendicular to the central axis of the annular valve seat.

A gas-tight shut-off valve with combined closing-heat protecting element may have an annular counter-seat that is arranged opposite the annular valve seat so as to form a slit therebetween. The combined closing-heat protecting element is then movable in this slit between the valve seat and the counter-seat, transversally to the central axis of the annular valve seat, and it is mounted so as to have a degree of freedom parallel to the central axis of the annular valve seat. The means for axially pressing the valve closing element and the annular valve seat together comprises means for axially moving the annular counter-seat. It follows that the combined closing-heat protecting element is sandwiched between the valve seat and the counter-seat when the latter is axially moved in the direction of the annular valve seat. A similar design of the gas-tight shut-off valve may be achieved without using a combined closing-heat protecting element. In this case the soft sealing means is associated with the annular valve seat and the heat protecting element forms an annular counter-seat that is arranged opposite the annular valve seat so as to form a slit therebetween. The closing element is movable in the slit between the valve seat and the counter-seat transversally to the central axis of the annular valve seat, wherein it is located outside the slit when it is in its second position. The means for axially pressing the valve closing element and the annular valve seat together comprises means for axially moving the annular counter-seat. The closing element of this valve has a degree of freedom parallel to the central axis of the annular valve seat, so that it is sandwiched between the valve seat and the counter-seat when the latter is axially moved in the direction of the annular valve seat. It remains to be pointed out that for achieving a gas-tight connection between the axially movable counter-seat and the housing, it is of advantage to use an axial expansion joint, as for example a bellow expansion joint.

If the closing element is pivoted about a horizontal pivoting axis extending laterally of the discharge opening, then the means used for moving the closing element between its first and second position may also be used for pressing the valve closing element and the annular valve seat together. Otherwise, the means for pressing the valve closing element and the annular valve seat together may be associated either with the valve seat for moving the latter relative to the valve closing element or with the valve closing element for axially moving the latter relative to the valve seat. If it is the valve seat that is moved relative to the valve closing element, it is of advantage to use an axial expansion joint, as for example a bellow expansion joint, for connecting the valve seat to the valve housing.

Finally, it will be appreciated that the soft sealing means may be associated with the valve closing element. In this case, the heat protecting element is, in its first position, located in front of the closing element, when the latter is located in its second position.

BRIEF DESCRIPTION OF THE DRAWINGS

Preferred embodiments of the present invention will now be described, by way of example, with reference to the accompanying drawings, in which.

DETAILED DESCRIPTION OF A PREFERRED EMBODIMENT

Figure 1:
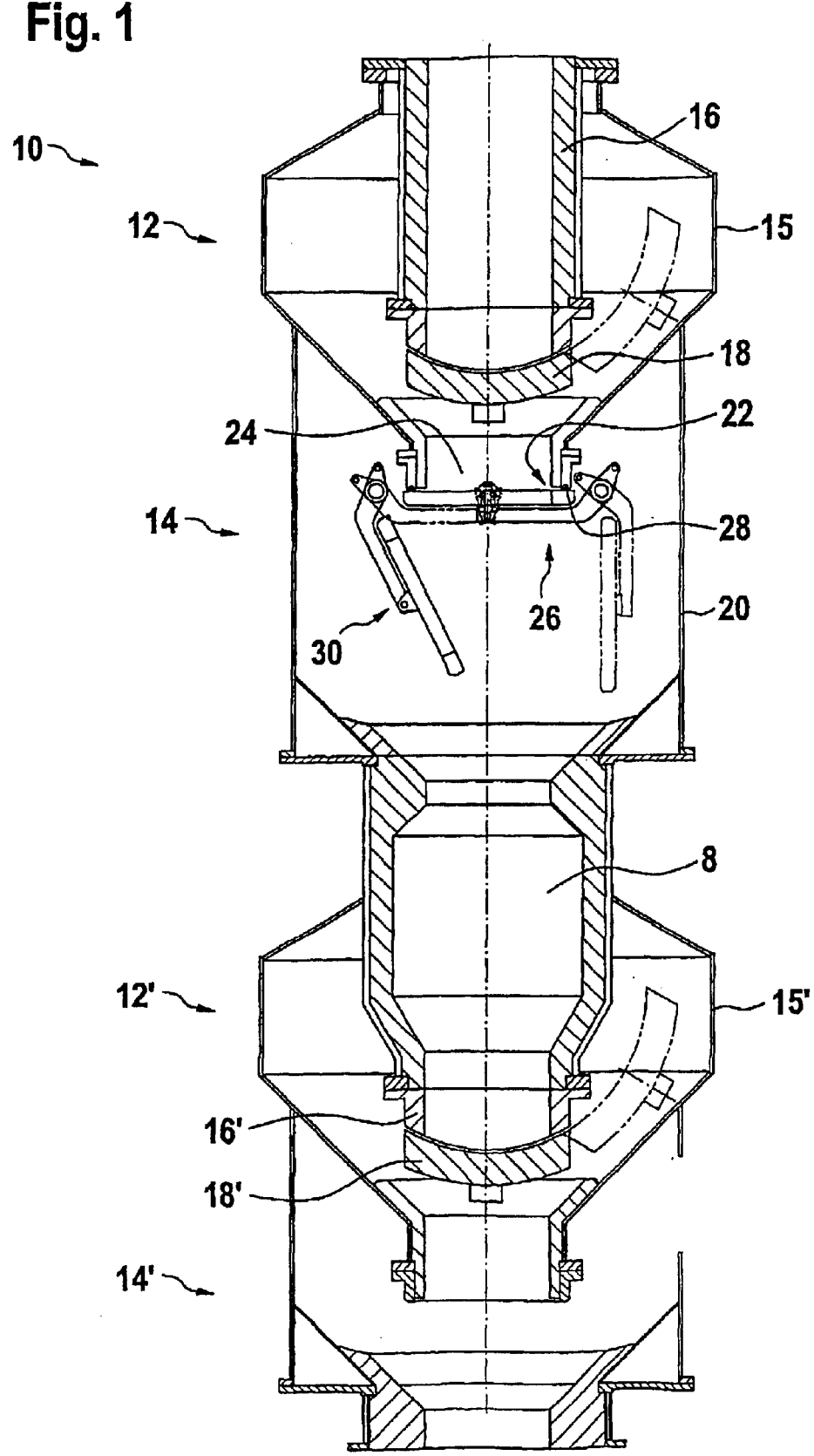
FIG. 1: is a schematic section through a material lock according to a first embodiment of the invention.

FIG. 1 shows a material discharging lock 10 designed for temperatures higher than 500° C. Such a material lock 10 generally comprises a lock chamber 8 equipped at its inlet and its outlet with a material retaining valve 12, 12' and a gastight shut-off valve 14, 14' mounted in series. In FIG. 1, the lower gastight shut-off valve 14' is only shown in part.

Each of the two material retaining valves 12, 12' comprises a gas-tight housing 15, 15', a material inlet tube 16, 16' and a shutter element 18, 18'. The latter can be pivoted between a first position, in which it blocks material discharge through the material inlet tube 16, 16', and a second position in which it is located laterally of the material inlet tube 16, 16', so as to allow material discharge therethrough.

The gastight shut-off valve 14 comprises a valve housing 20, to which an annular valve seat 22 is connected in a gas-tight manner. The annular valve seat 22 surrounds a discharge opening 24, which can be closed by means of a closing element 26. The latter is mounted in the housing 20 so that it can be moved between a first position, in which it is axially pressed on the annular valve seat 22, and a second position, in which it is located laterally of the discharge opening 24, out of the flow of the material. In FIG. 1, the closing element 26 is shown in its first position with continuous lines and in its second position with dotted lines.

A synthetic seal ring 28 is arranged in the annular valve seat 22, in such a way that when the closing element 26 sits on the annular valve seat 22 (i.e. when it is in its first position), an exposed sealing surface of the seal ring 28 is pressed against a sealing means contact surface on the valve closing element 26, for providing gas-tightness between the closing element 26 and the annular valve seat 22. The annular valve seat 22 and the sealing means contact surface on the valve closing element 26 are both provided with a cooling circuit (not shown), which is designed so as to keep their temperature well below the maximum working temperature warranted for the sealing ring.

When the gastight shut-off valve 14 is opened, the exposed sealing surface of the seal ring 28 is uncovered by the cooled closing element 26. This sealing surface is now exposed to direct heat radiation in the valve housing. Therefore, before the material retaining valve 12 is opened, a heat protecting element 30 is put onto the annular valve seat 22 in order to cover the exposed sealing surface of the seal ring 28 and thereby protect it against direct heat radiation in the valve housing.

Figure 2:
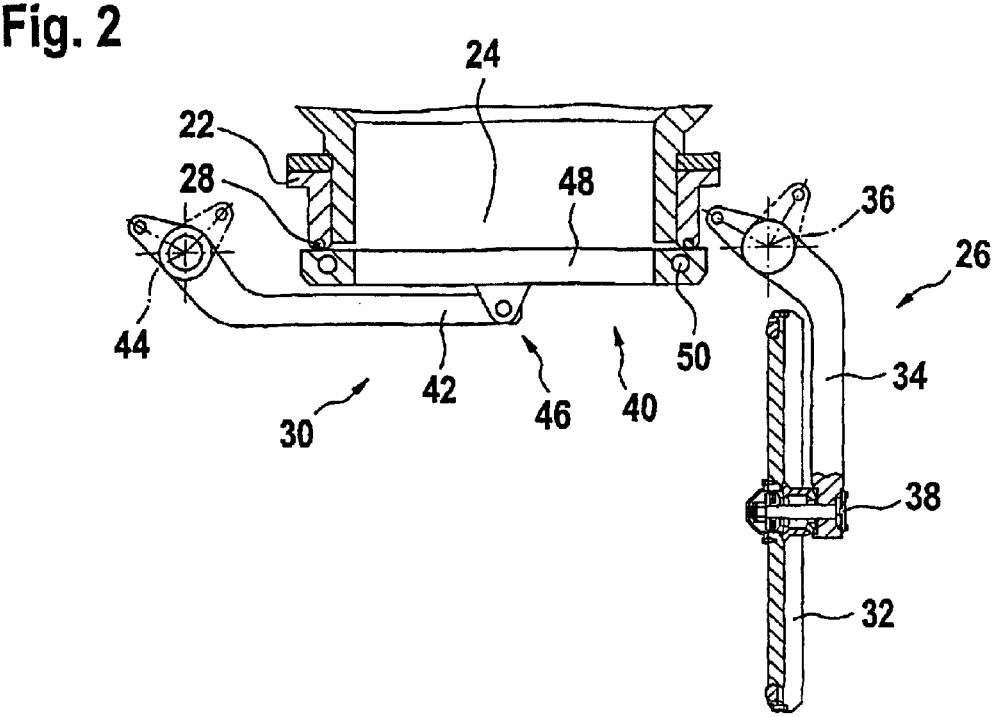
FIG. 2: is a detail section view of the closing and heat protecting elements of the material lock of FIG. 1.
Figure 3:
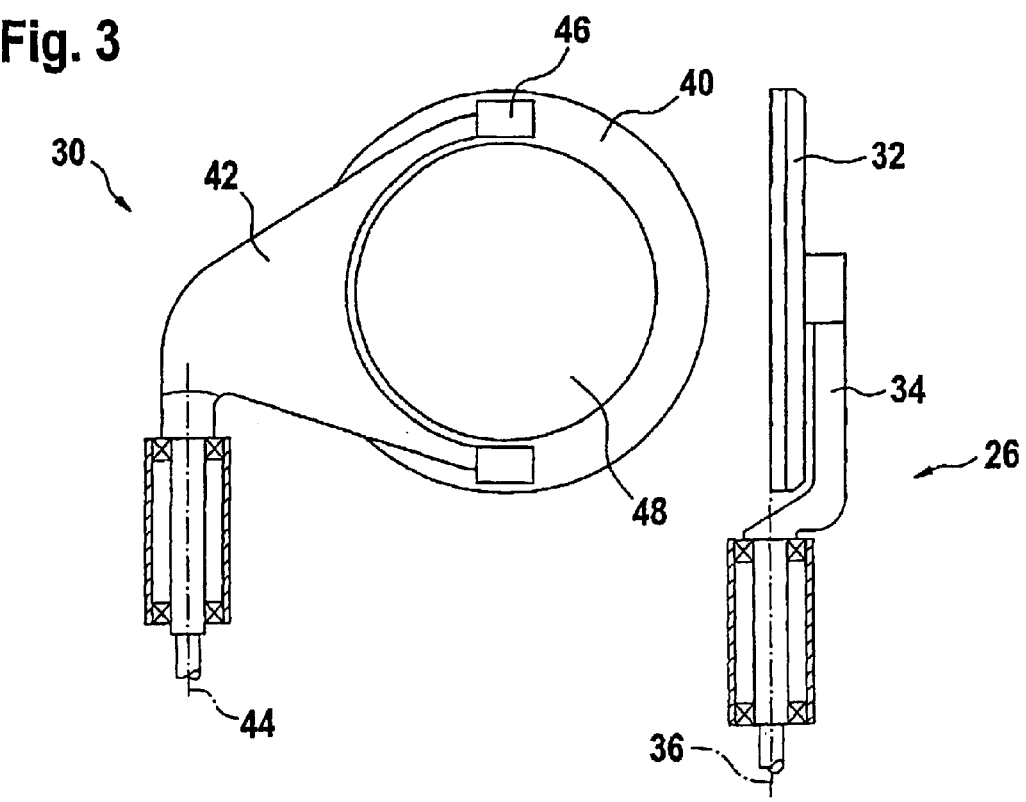
FIG. 3: is a detail top view of the closing and heat protecting elements of the material lock of FIG. 1.

Both the closing element 26 and the heat protecting element 30 can be more clearly seen on FIG. 2 and FIG. 3.

The closing element 26 comprises a closing plate 32 mounted on an arm 34, which is pivotable about a horizontal pivoting axis 36 located laterally of the valve seat 22. An articulation 38 between the closing plate 32 and the pivoting arm 34 gives the closing plate 32 a certain degree of freedom, so that the closing element 26 can be pressed against the seal ring 28 of the annular valve seat 22. It will be noted that in this embodiment, the means used for pivoting the closing element 26 about its horizontal pivoting axis 36 are also used for pressing it against the annular valve seat 22.

The heat protecting element 30 has a ring plate 40 mounted on an arm 42, which is pivotable about a horizontal pivoting axis 44 located laterally of the valve seat 22. An articulation 46 between the ring plate 40 and the pivoting arm 42 gives the ring plate 40 a certain degree of freedom, so that it can be tightly pressed against the seal ring 28 of the annular valve seat 22. The ring plate 40 has a discharge opening 48 therethrough which has essentially the same diameter as the discharge opening 24 of the annular valve seat 22. An internal cooling circuit 50 ensures that the temperature of the contact surface of the ring plate 40, i.e. the surface that is pressed against the seal ring 28, is well below the maximum working temperature warranted for the sealing ring 28. The ring plate 40 can further comprise gas outlet nozzles (not shown) for blowing gas from a separate internal gas distribution channel onto the exposed seal ring 28. Alternatively, gas can be circulated as a cooling fluid through the cooling circuit 50, before it is discharged through the aforementioned gas outlet nozzles.

Figure 4:
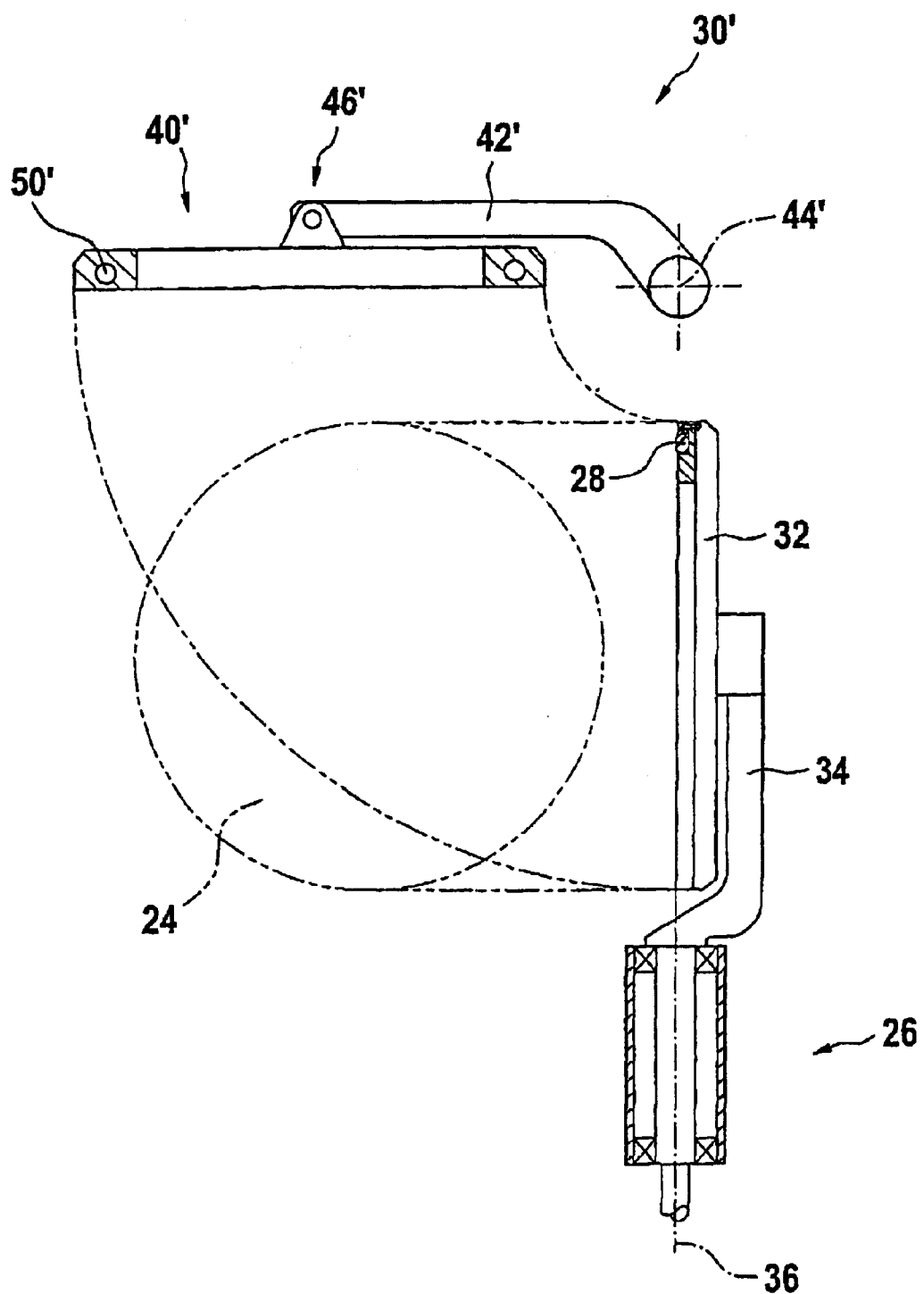
FIG. 4: is a detail top view of the closing and heat protecting elements of the material lock according to a second embodiment of the invention.

According to a second embodiment, shown in FIG. 4, the seal ring 28 is arranged on the closing plate 32 of the closing element 26. Before the material retaining valve 12 is opened, the closing element 26 is moved into its second position, i.e. laterally of the discharge opening 24, out of the flow of the material. In this position, the sealing surface of the seal ring 28 is exposed to direct heat radiation in the valve housing. Therefore, before the material retaining valve 12 is opened, a heat protecting element 30' is put onto the closing element 26 in order to cover the exposed sealing surface of the seal ring 28 and thereby protect it against direct heat radiation in the valve housing.

The heat protecting element 30' has a protecting plate 40' mounted on an arm 42', which is pivotable about a vertical pivoting axis 44'. An articulation 46' between the protecting plate 40' and the pivoting arm 42' gives the protecting plate 40' a certain degree of freedom, so that it can be tightly pressed against the seal ring 28 of the closing element 26. An internal cooling circuit 50' ensures that the temperature of the contact surface of the protecting plate 40', i.e. the surface that is pressed against the seal ring 28, is well below the maximum working temperature warranted for the sealing ring 28. Just as the ring plate 40, the protecting plate 40' can further comprise gas outlet nozzles (not shown) for blowing gas onto the exposed seal ring 28.

Figure 5:
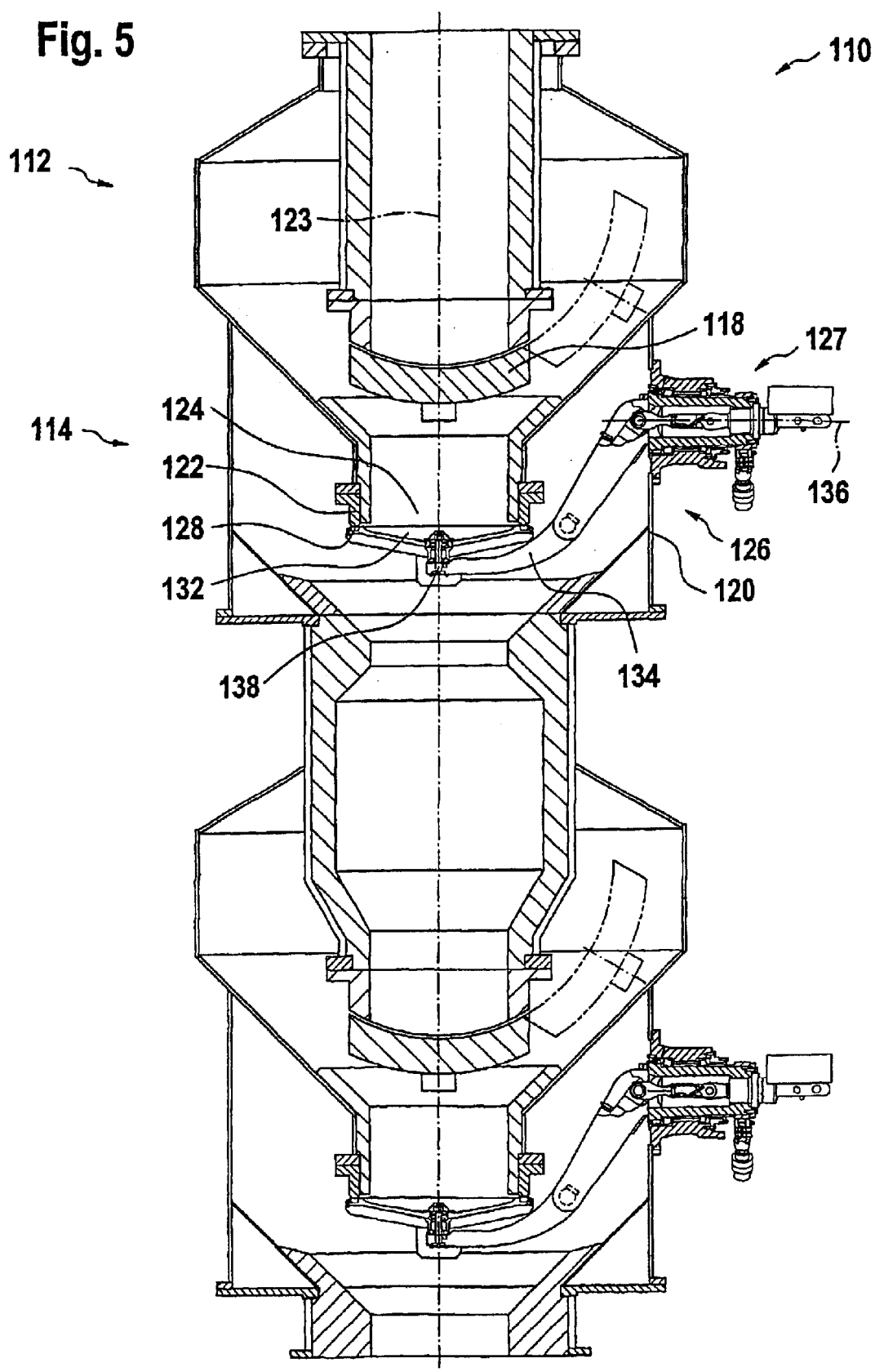
FIG. 5: is a schematic section through a material lock according to a third embodiment of the invention.

FIG. 5 shows a material lock according to a third embodiment of the invention. The gastight shut-off valve 114 comprises a closing element 126 comprising a closing plate 132 which has the seal ring 128 mounted thereon. A pivoting mechanism 127 allows to pivot the closing element 126 about a horizontal pivoting axis 136, which intersects the central axis 123 of the annular valve seat 122, between a first position, in which the closing plate 132 can be axially pressed on the annular valve seat 22, and a second position, in which the closing plate 132 is located laterally of the discharge opening 24, out of the flow of the material. The same mechanism also allows to move the closing plate 132 in the direction of the central axis 123 of the annular valve seat 122. In other words, it allows to press the closing plate 132 in its first position axially against the annular valve seat 122, respectively, to lift it axially from the annular valve seat 122 before it is pivoted about the horizontal pivoting axis 136 in its second position. In FIG. 5, the closing element 126 is shown in its first, i.e. its closed position. Before the shutter element 118 of the material retaining valve 112 is opened, the closing element 132 is lowered and pivoted about the pivoting axis 136, so as to bring the closing element 132 in its second position, out of the flow of the material. In order to protect the seal ring 128 mounted on the closing element 132, a heat protecting element (not shown) is moved onto the closing element 132 when the latter is in its second position, so as to cover the seal ring 128. The heat protecting element can e.g. be a heat protecting element similar to the one shown in FIG. 4.

Figure 6:
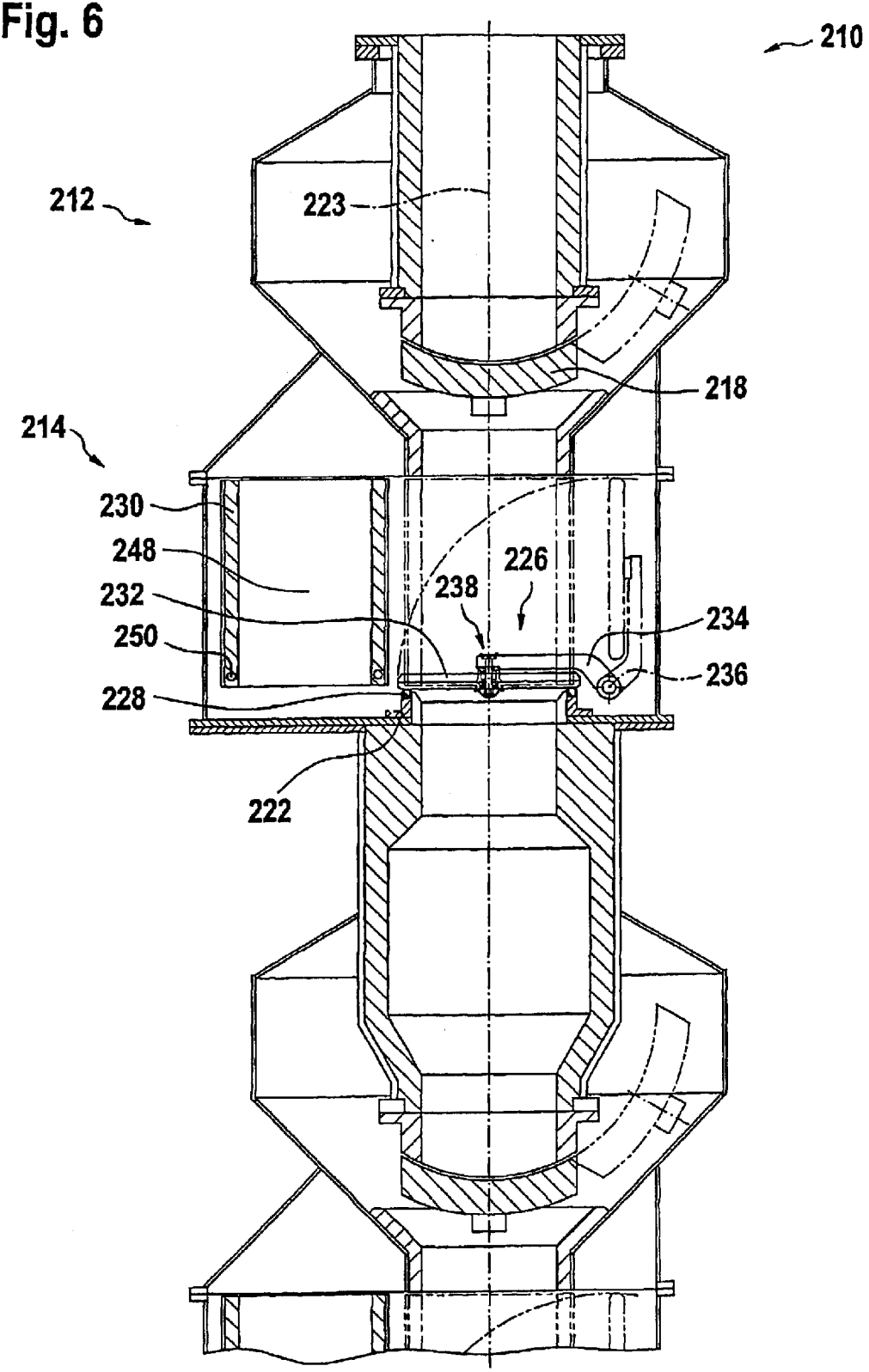
FIG. 6: is a schematic section through a material lock according to a fourth embodiment of the invention.

FIG. 6 shows a material lock according to a fourth embodiment of the invention. A closing element 226 has a closing plate 232 mounted on an arm 234, which is pivotable about a pivoting axis 236. An articulation 238 between the closing plate 232 and the arm 234 gives the closing plate 232 a certain degree of freedom, so that it can be tightly pressed against the seal ring 228 of the annular valve seat 222. A heat protecting element 230 is formed as a tube with a discharge channel 248 therethrough. Before the shutter element 218 of the material retaining valve 212 is opened, the closing element 232 is pivoted about the pivoting axis 236 of the arm 234, so as to bring the closing element 232 in a lateral position, out of the flow of the material. In order to protect the seal ring 228 mounted on the annular valve seat 222, the heat protecting element 230 is then brought, either through a sliding or pivoting movement, into axial alignment with the central axis 223 of the annular valve seat 222. In this position it covers the seal ring 228. An internal cooling circuit 250 ensures that the temperature of the lower front surface of the protecting element 230, i.e. the surface that faces the seal ring 28, is well below the maximum working temperature warranted for the seal ring 228. The heat protecting element 230 can further comprise gas outlet nozzles (not shown) for blowing gas from the internal cooling circuit 250 onto the exposed sealing surface of the seal ring 228.

Figure 7:
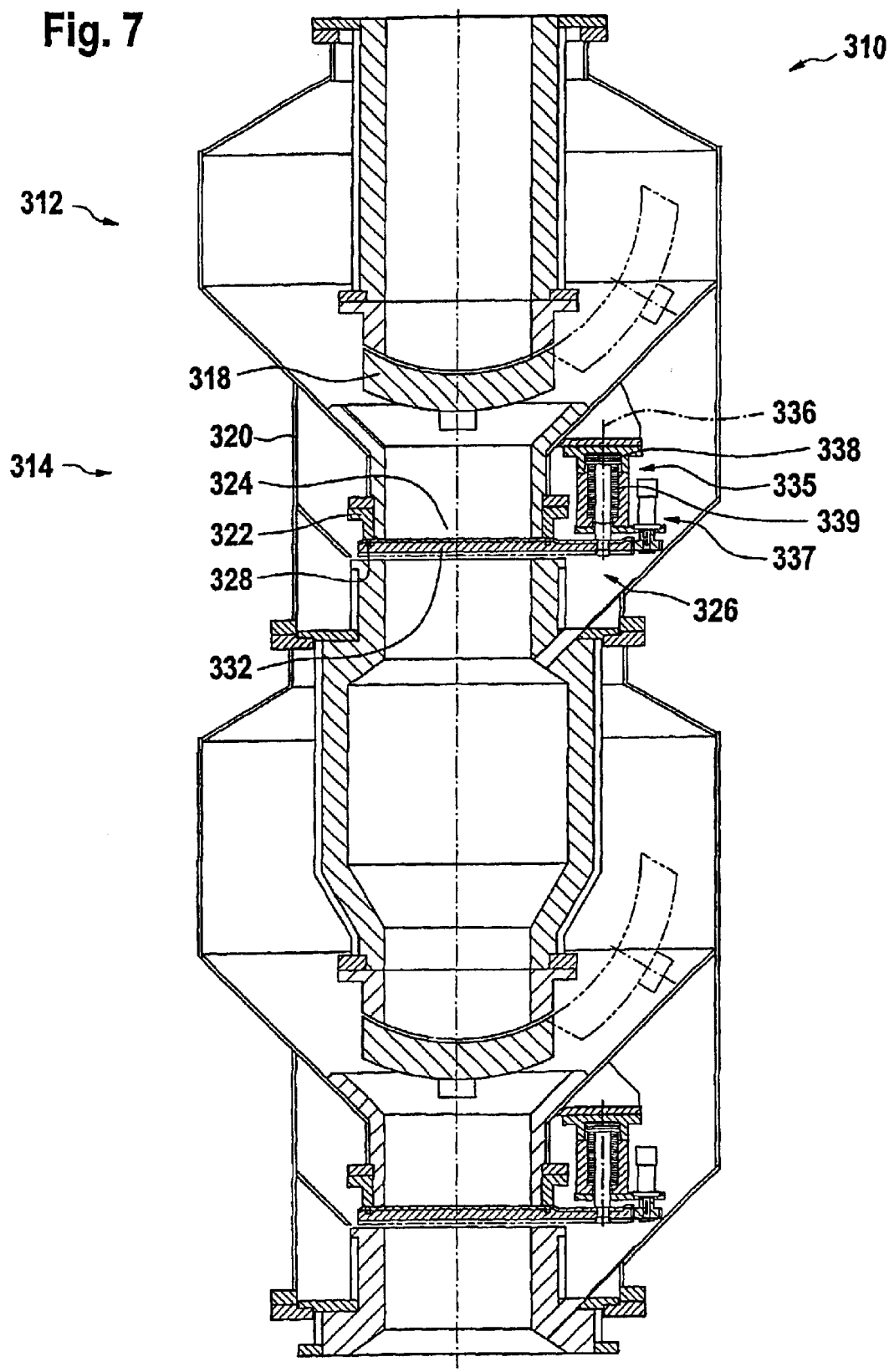
FIG. 7: is a schematic section through a material lock according to a fifth embodiment of the invention.

FIG. 7 shows a material lock according to a fifth embodiment of the invention. The gastight shut-off valve 314 comprises a closing element 326 comprising a closing plate 332, which has the seal ring 328 mounted thereon. The closing element 326 is connected to the housing 320 by means of a cylindrical articulation 335 so that it is pivotable about a vertical pivoting axis 336 by means of a rotary motor 337. The cylindrical articulation 335 comprises a linear actuator with a piston 338 and pull back springs 339. In FIG. 7, the closing element 326 is shown in its closed position, wherein the closing element 326 is pulled against the annular valve seat 322 by means of the pull back springs 339. Before the shutter element 318 of the material retaining valve 312 is opened, the closing element 332 is first lowered by pressurising the piston 338. Thereafter it can be pivoted about the pivoting axis 336, so as to bring the closing element 332 in its second position, i.e. laterally of the discharge opening 324, out of the flow of the material. In order to protect the seal ring 328 mounted on the closing element 332, a heat protecting element (not shown) is moved over the closing element 332 in its second position, so as to cover the seal ring 328. The heat protecting element can e.g. be a heat protecting element similar to the one shown in FIG. 4, with the difference that it is must be pivoted about a horizontal axis or simply be lowered onto the closing element 332 in its second position.

Figure 8:
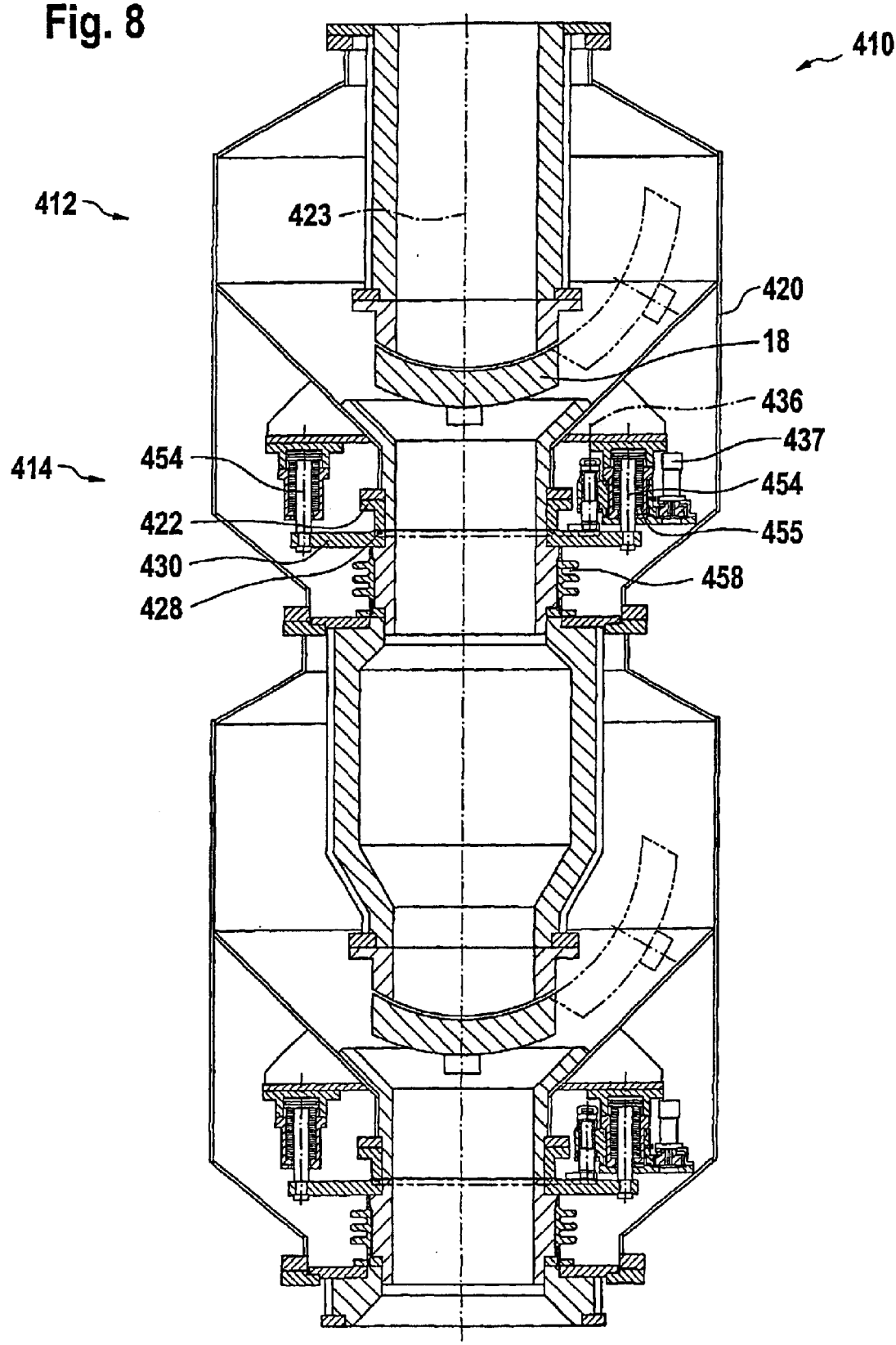
FIG. 8: is a schematic section through a material lock according to a sixth embodiment of the invention.

FIG. 8 shows a material lock according to a sixth embodiment of the invention. The gastight shut-off valve 414 comprises a valve housing 420 to which an annular valve seat 422, having seal ring 428 mounted thereon, is connected. Opposite the annular valve seat 422, an annular counter-seat is arranged, which forms the heat protecting element 430. In FIG. 8, the gastight shut-off valve 414 is shown in an open position, wherein the heat protecting element 430 is axially pressed against the valve seat 422, so that the seal ring 428 is sandwiched between the heat protecting element 430 and the valve seat 422, which are both cooled. In order to close the gastight shut-off valve 414, the heat protecting element 430 is axially moved downwards, so as to open a slit between the heat protecting element 430 and the annular valve seat 422. A closing element (not shown), which is formed by a thin plate, is then pivoted from its second position, in which it is located laterally of this slit, into its first position in the slit, e.g. by pivoting it about a vertical axis 436 by means of a rotary motor 437. When the heat protecting element 430 is now pulled in the direction of the valve seat 422, the closing element, which has a degree of freedom parallel to the central axis 423 of the annular valve seat 422, is sandwiched between the annular valve seat 422 and the heat protecting element 430. It remains to be noted that the axial movement of the heat protecting element 430 is achieved by means of pistons 454, which are equipped with pull back springs 455. An bellow expansion joint 458 connects the heat protecting element 430 to the valve housing 420. The heat protecting element 430 will generally comprise an internal cooling circuit (not shown), for ensuring that the temperature of its surface pressed against the seal ring 428 is well below the maximum working temperature warranted for the seal ring 428. The same cooling system also ensures that the contact surface of the closing element, which is pressed against the seal ring 428 is cooled in the closed position of the valve. The heat protecting element 430 can further comprise gas outlet nozzles (not shown) for blowing gas onto the exposed seal ring 428.

Figure 9:
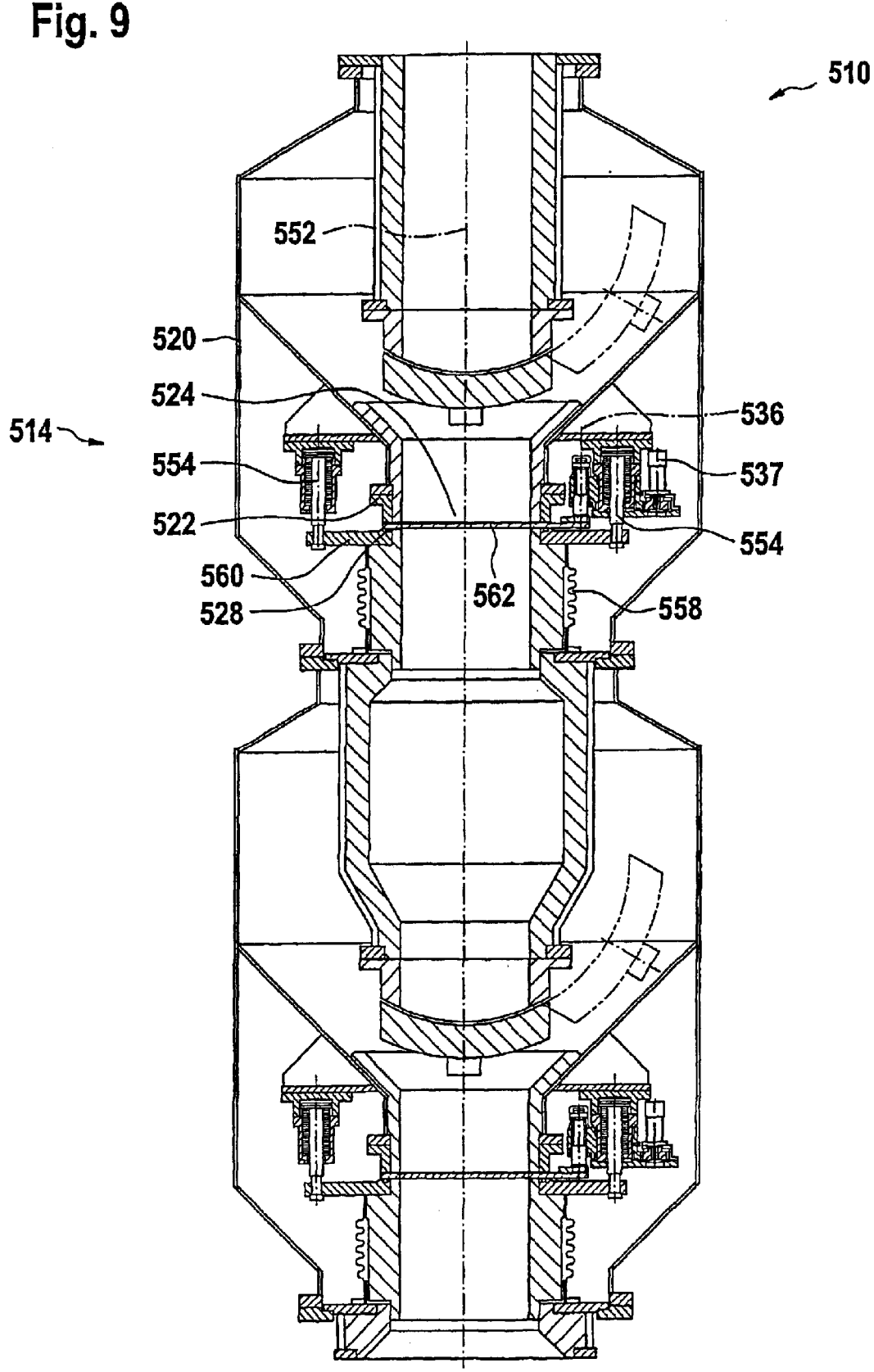
FIG. 9: is a schematic section through a material lock according to a seventh embodiment of the invention.
Figure 10:
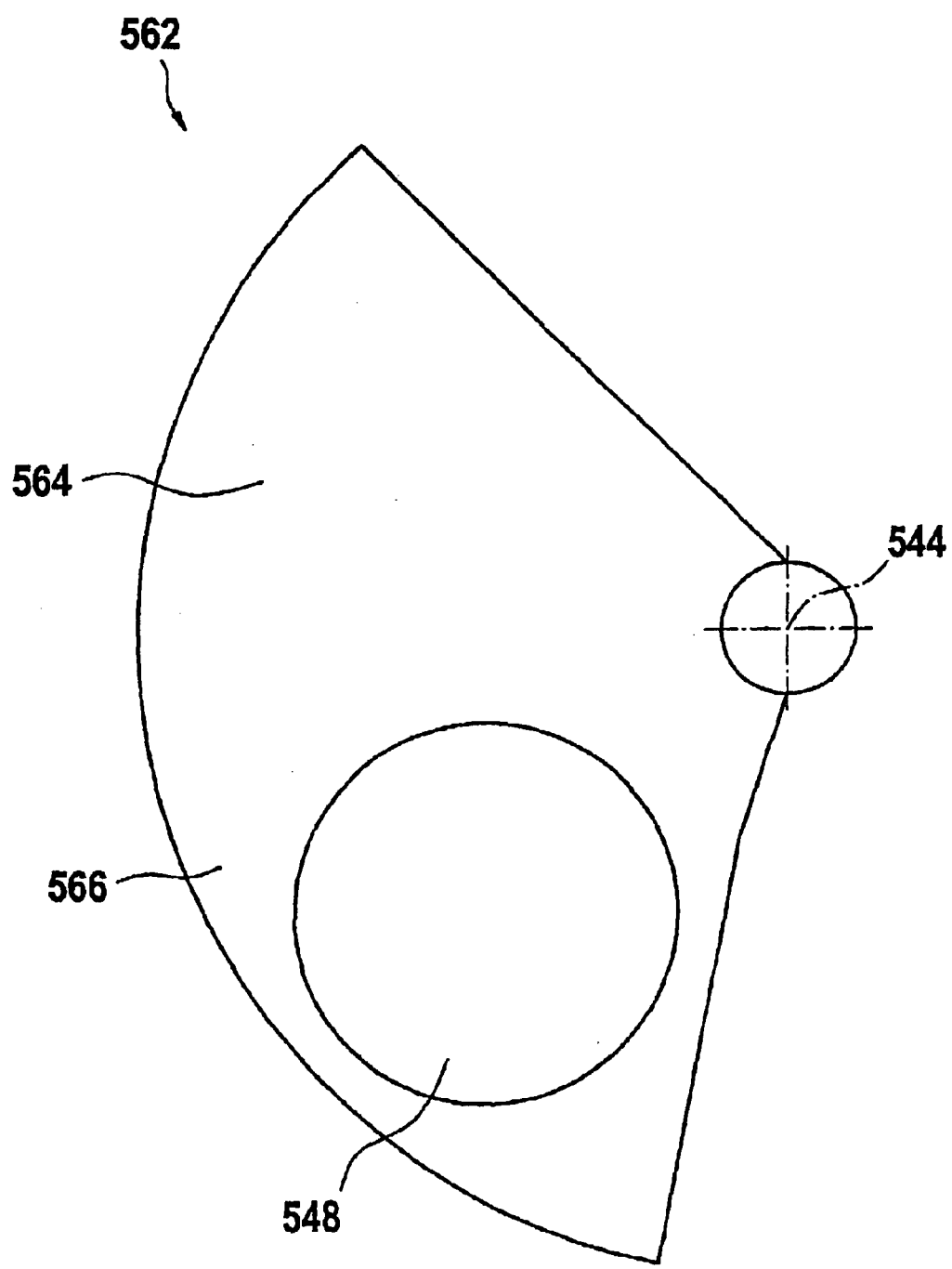
FIG. 10: is a top view of a combined closing-heat protecting element of FIG. 9.

FIG. 9 shows a material lock according to a seventh embodiment of the invention. The main difference between the material locks of FIGS. 8 and 9 is that in FIG. 9 a combined closing-heat protecting element 562 is arranged between the annular valve seat 522 and the counter-seat 560. The combined closing-heat protecting element 562 can be more closely seen in FIG. 10. It comprises a closing portion 564 and a protecting portion 566. The protecting portion 566 has a discharge opening 548 therethrough, which has essentially the same diameter as the discharge opening 524 of the annular valve seat 522. The combined closing-heat protecting element 562 is pivotable about a vertical pivoting axis 536 by means of a rotary motor 537. When the closing portion 564 of combined closing-heat protecting element 562 covers the discharge opening 524 of the annular valve seat 522, the gastight shut-off valve 514 is in its closed position. When the protecting portion 566 of the combined closing-heat protecting element 562 covers the discharge opening 524 of the annular valve seat 522, the gastight shut-off valve 514 is in its open position. In this position, the seal ring 528 mounted on the annular valve seat 522 is covered by the heat protecting portion 566 of the combined closing-heat protecting element 562. It will be appreciated, that instead of the movement of the combined closing-heat protecting element 562 being a pivoting movement, this can alternatively be a translating movement.

Figure 11:
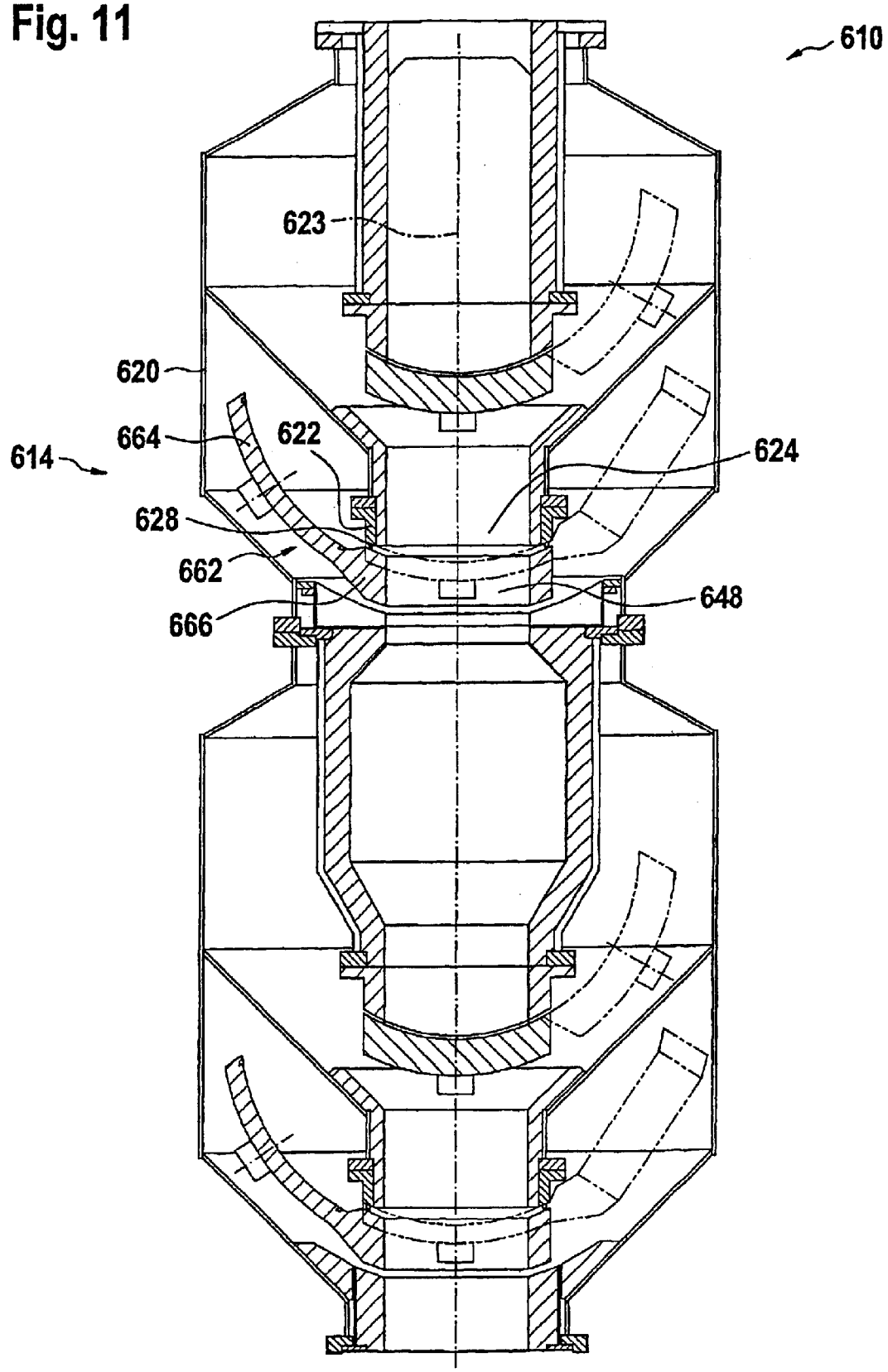
FIG. 11: is a schematic section through a material lock according to an eighth embodiment of the invention.
Figure 12:
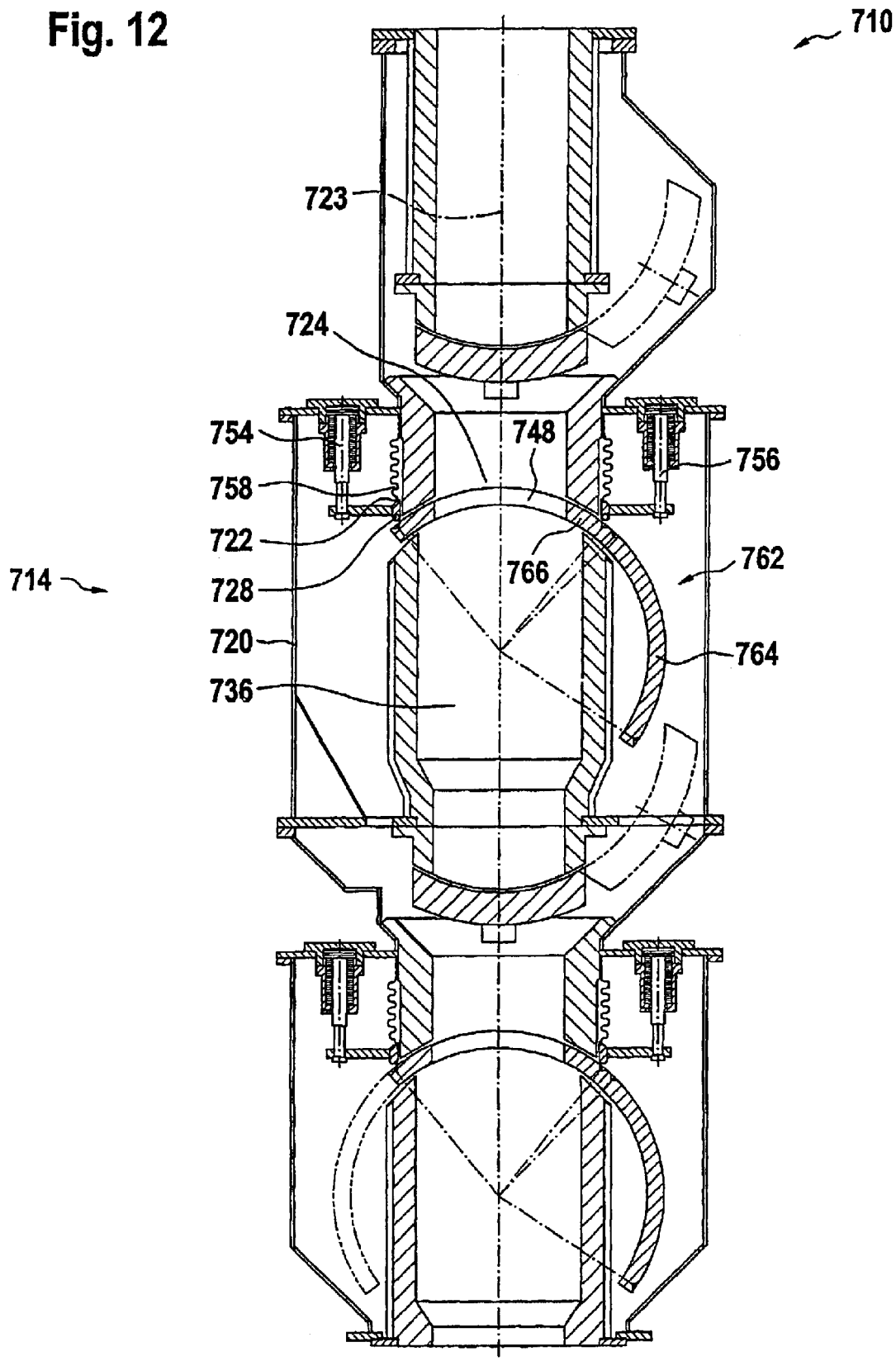
FIG. 12: is a schematic section through a material lock according to a further embodiment of the invention.
Figure 13:
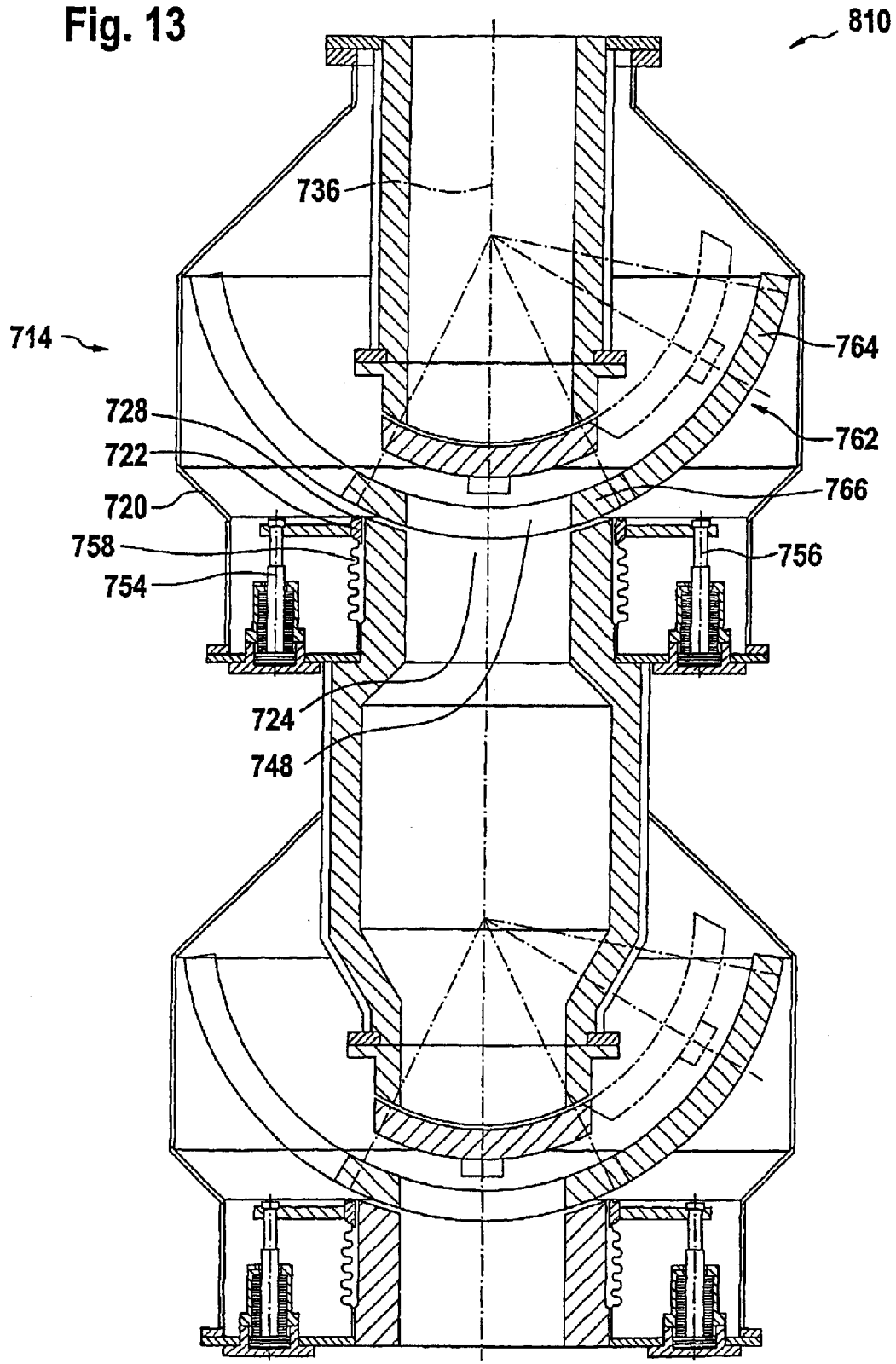
FIG. 13: is a schematic section through a material lock according to a further embodiment of the invention.
Figure 14:
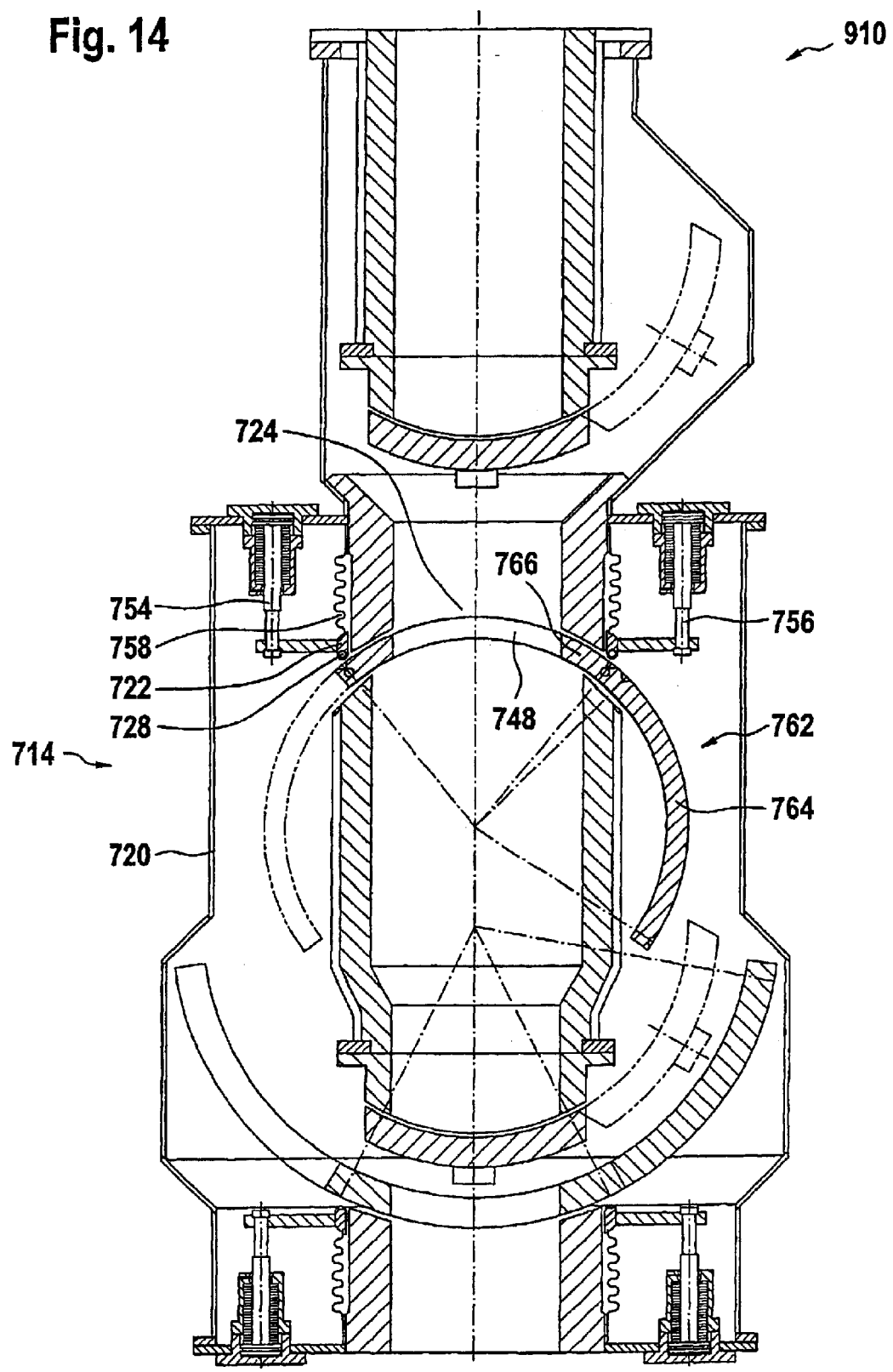
FIG. 14: is a schematic section through a material lock according to a further embodiment of the invention.
Figure 15:
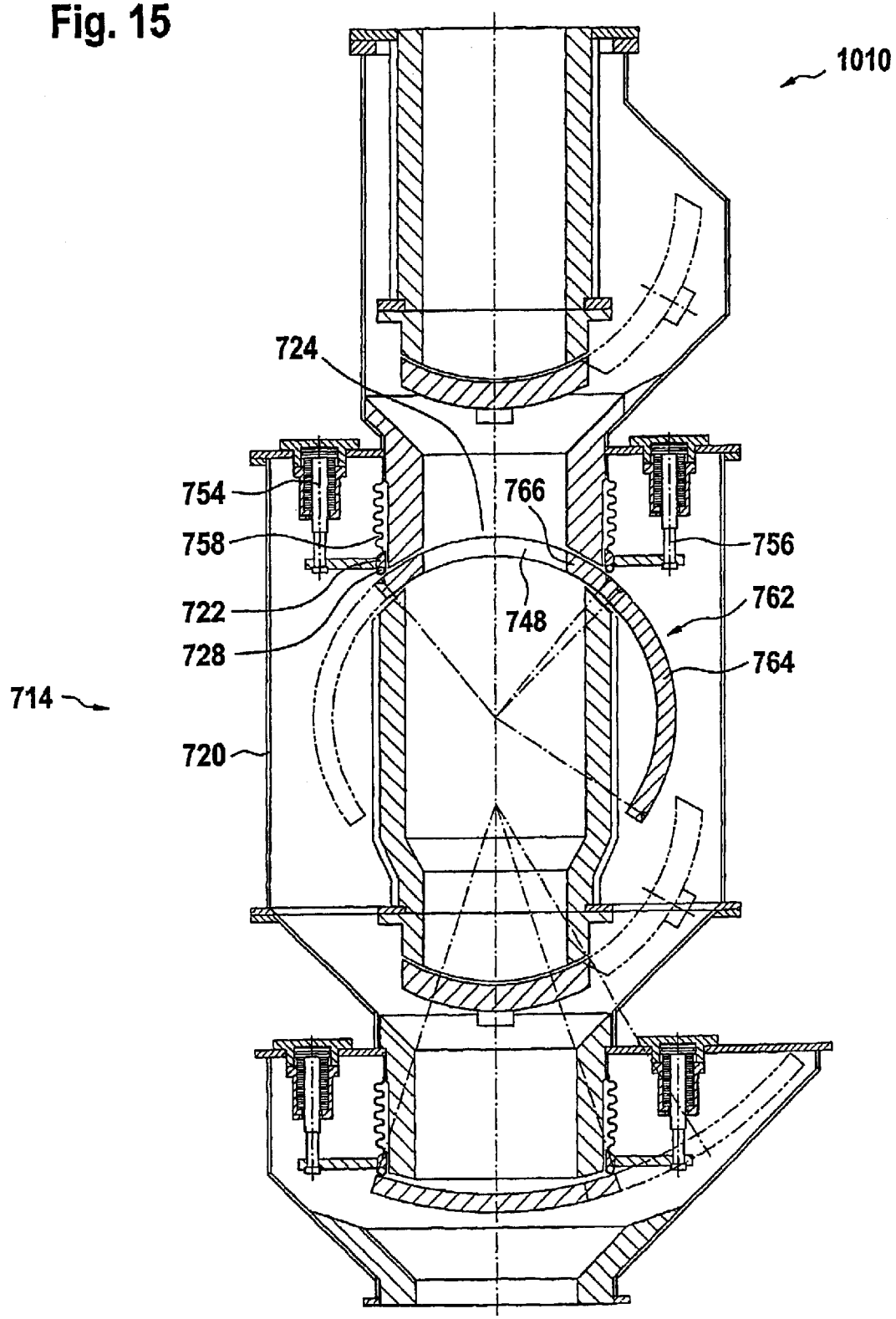
FIG. 15: is a schematic section through a material lock according to a further embodiment of the invention.

FIG. 11 shows a material lock according to an eighth embodiment of the invention. The gastight shut-off valve 614 comprises a valve housing 620 to which an annular valve seat 622, having seal ring 628 mounted thereon, is connected. Below the annular valve seat 622, a combined closing-heat protecting element 662, having a closing portion 664 and a protecting portion 666, is arranged. The protecting portion 666 has a discharge opening 648 therethrough, which has essentially the same diameter as the discharge opening 624 of the annular valve seat 622. The combined closing-heat protecting element 662 has a spherical form and is pivotable about a horizontal axis that intersects the central axis 623 of the annular valve seat 622. Just as the closing element of FIG. 5, a mechanism (not shown) allows to move the combined closing-heat protecting element 662 in the direction of the central axis 623 of the annular valve seat 122. In other words, it allows to press the combined closing-heat protecting element 662 axially against the annular valve seat 622, respectively, to lift it axially from the annular valve seat 122 before it is pivoted about the horizontal pivoting axis. When the closing portion 664 of combined closing-heat protecting element 662 is pressed against the annular valve seat 622, the gastight shut-off valve 614 is in its closed position. When the protecting portion 666 of the combined closing-heat protecting element 662 is pressed against the annular valve seat 622, the gastight shut-off valve 614 is in its open position. In this position the seal ring 628 mounted on the annular valve seat 622 is protected by the protecting portion 666 of the combined closing-heat protecting element 662. In order to open or close the gastight shut-off valve 614, the combined closing-heat protecting element 662 is axially moved downwards, so as to free itself from the annular valve seat 622. The combined closing-heat protecting element 662 can now be pivoted from one position into the other. After the combined closing-heat protecting element 662 has been brought in the desired position, it is then pulled upwards against the valve seat 622. It will be appreciated that the protecting portion 666 can further comprise an internal cooling circuit (not shown) for cooling down the seal ring 628 when the protecting portion 666 is on the annular valve seat 622. It can further comprise gas outlet nozzles (not shown) for blowing gas from the internal cooling circuit (not shown) onto the exposed seal ring 628.

FIG. 12, FIG. 13, FIG. 14 and FIG. 15 each show a material lock according to further embodiments of the invention. These embodiments all comprise a spherical combined closing-heat protecting element 762, having a closing portion 764 and a protecting portion 766 with a discharge opening 748. The gastight shut-off valve 714 comprises a valve housing 720 to which an annular valve seat 722 is connected. The annular valve seat 722 has seal ring 728 mounted thereon. The combined closing-heat protecting element 762 is pivotable about a horizontal axis that intersects the central axis of the valve seat 722. When the closing portion 764 of the combined closing-heat protecting element 762 covers the discharge opening 724 of the annular valve seat 722, the gastight shut-off valve 714 is in its closed position. When the protecting portion 766 of the combined closing-heat protecting element 762 covers the discharge opening 724 of the annular valve seat 722, the gastight shut-off valve 714 is in its open position. In this position the seal ring 728 mounted on the annular valve seat 722 is protected by the protecting portion 766 of the combined closing-heat protecting element 762. In order to open or close the gastight shut-off valve 714, the annular valve seat 722 is axially pulled back from the combined closing-heat protecting element 762. The combined closing-heat protecting element 762 can now be pivoted from one position into the other, without being in contact with the seal ring 728 mounted on the annular valve seat 722. After the combined closing-heat protecting element 762 has been brought into the desired position, the annular valve seat 722 is then pressed against corresponding contact surfaces on the combined closing-heat protecting element 762. The axial movement of the annular valve seat 722 is achieved by means of pistons 754, 756. An axial expansion joint 758 connects the annular valve seat 722 to the valve housing 720. It will be appreciated that both the closing portion 764 and the protecting portion 766 will generally comprise an internal cooling circuit (not shown), for ensuring that the temperature of their respective contact surface pressed against the seal ring 428 is well below the maximum working temperature warranted for the seal ring 428. They can further comprise gas outlet nozzles (not shown) for blowing gas onto the exposed seal ring 728.

What is claimed is:

1. A gas-tight shut-off valve for a material charging or discharging lock, comprising:
   a valve housing;
   an annular valve seat connected to said valve housing, said valve seat surrounding a discharge opening;
   a valve closing element associated in said valve housing with said valve seat, said valve closing element being movable between a first position, in which said valve closing element and said annular valve seat can be axially pressed together and a second position, in which said valve closing element is located laterally of longitudinal axis of said discharge opening;
   means for axially pressing said valve closing element and said annular valve seat together when said valve closing element in its first position;
   a soft sealing means associated either with said annular valve seat or with said valve closing element, said soft sealing means having an exposed sealing surface to be pressed against a sealing means contact surface on said valve closing element, respectively on said valve seat, for providing gas tightness when said valve seat and said valve closing element are pressed together; and
   a heat protecting element that is movable in said valve housing between a first position, in which it covers said exposed sealing surface when said valve closing element is in its second position, and a second position, in which it uncovers said exposed sealing surface, so as to enable again a gas-tight contact between said exposed sealing surface and said sealing means contact surface.

2. The gas-tight shut-off valve as claimed in claim 1, wherein said heat protecting element comprises an internal cooling circuit.

3. The gas-tight shut-off valve as claimed in claim 1, wherein said heat protecting element comprises a connection to a gas circuit and gas outlet nozzles located in said heat protecting element, so as to be capable of blowing a gas onto said exposed sealing surface.

4. The gas-tight shut-off valve as claimed in claim 1, wherein said soft sealing means is associated with said annular valve seat and said heat protecting element has a discharge opening therein, which is axially aligned with said discharge opening in said annular valve seat when said heat protecting element is in its first position.

5. The gas-tight shut-off valve as claimed in claim 4, wherein said heat protecting element is a ring-shaped element, which is pivotable about a pivoting axis between its first and second position.

6. The gas-tight shut-off valve as claimed in claim 5, wherein said pivoting axis is parallel to the central axis of said annular valve seat and located laterally of said annular valve seat.

7. The gas-tight shut-off valve as claimed in claim 5, wherein said pivoting axis is perpendicular to the direction of the central axis of said annular valve seat and located laterally of said annular valve seat.

8. The gas-tight shut-off valve as claimed in claim 5, wherein said heat protecting element and said valve closing element form a combined closing-heat protecting element, which has a closing portion fulfilling the function of said valve closing element and a heat protecting portion fulfilling the function of said heat protecting element, said heat protecting portion having a discharge opening therein, which is axially aligned with said discharge opening in said annular valve seat when said heat protecting portion covers said soft sealing means.

9. The gas-tight shut-off valve as claimed in claim 8, wherein said combined closing-heat protecting element is a spherical or cylindrical element which is pivotable about a pivoting axis that is perpendicular to the central axis of said annular valve seat.

10. The gas-tight shut-off valve as claimed in claim 8, wherein said combined closing-heat protecting element is a flat plate element which is movable in a plane that is perpendicular to the central axis of said annular valve seat.

11. The gas-tight shut-off valve as claimed in claim 8, wherein:
- an annular counter-seat is arranged opposite said annular valve seat so as to form a slit therebetween;
- said combined closing-heat protecting element is movable in said slit between said valve seat and said counter-seat transversally to the central axis of said annular valve seat;
- said means for axially pressing said valve closing element and said annular valve seat together comprises means for axially moving said annular counter-seat; and
- said combined closing-heat protecting element further has a degree of freedom parallel to the central axis of said annular valve seat, so that said combined closing-heat protecting element is sandwiched between said valve seat and said counter-seat when the latter is axially moved in the direction of said annular valve seat.

12. The gas-tight shut-off valve as claimed in claim 1, wherein:
- said soft sealing means is associated with said annular valve seat;
- said heat protecting element forms an annular counter-seat that is arranged opposite said annular valve seat so as to form a slit therebetween;
- said closing element is movable in said slit between said valve seat and said counter-seat transversally to the central axis of said annular valve seat, wherein it is located outside said slit when it is in its second position;
- said means for axially pressing said valve closing element and said annular valve seat together comprises means for axially moving said annular counter-seat;
- said closing element further has a degree of freedom parallel to the central axis of said annular valve seat, so that it is sandwiched between said valve seat and said counter-seat when the latter is axially moved in the direction of said annular valve seat.

13. The gas-tight shut-off valve as claimed in claim 12, further comprising an axial expansion joint connecting said annular counter-seat to said valve housing.

14. The gas-tight shut-off valve as claimed in claim 1, wherein said means for pressing said valve closing element and said annular valve seat together is associated with said valve seat for moving the latter relative to said valve closing element.

15. The gas-tight shut-off valve as claimed in claim 14, further comprising an axial expansion joint connecting said valve seat to said valve housing.

16. The gas-tight shut-off valve as claimed in claim 1, wherein said means for pressing said valve closing element and said annular valve seat together is associated with said valve closing element for axially moving the latter relative to said valve seat.

17. The gas-tight shut-off valve as claimed in claim 1, wherein said soft sealing means is associated with said valve closing element, and said heat protecting element is, in its first position, located in front of said closing element, when the latter is located in its second position.

18. A gas-tight shut-off valve for a material charging or discharging lock, comprising:
- a valve housing;
- an annular valve seat connected to said valve housing, said valve seat surrounding a discharge opening;
- a valve closing element associated in said valve housing with said valve seat, said valve closing element being movable between a first position, in which said valve closing element and said annular valve seat can be axially pressed together, and a second position, in which said valve closing element is located laterally of said discharge opening;
- means for axially pressing said valve closing element and said annular valve seat together when said valve closing element in its first position;
- a soft sealing means associated either with said annular valve seat or with said valve closing element, said soft sealing means having an exposed sealing surface to be pressed against a sealing means contact surface on said valve closing element, respectively on said valve seat, for providing gas tightness when said valve seat and said valve closing element are pressed together; and
- a heat protecting element that includes an internal cooling circuit and is movable in said valve housing between a first position, in which it covers said exposed sealing surface when said valve closing element is in its second position, and a second position, in which it uncovers said exposed sealing surface, so as to enable again a gas-tight contact between said exposed sealing surface and said sealing means contact surface.

* * * * *